United States Patent [19]

Neri et al.

[11] Patent Number: 5,240,642
[45] Date of Patent: Aug. 31, 1993

[54] PROCESS FOR OBTAINING GRANULAR FORMS OF ADDITIVES FOR ORGANIC POLYMERS

[75] Inventors: Carlo Neri; Luciano Pallini, both of Milan, Italy

[73] Assignee: Enichem Synthesis S.p.A., Palermo, Italy

[21] Appl. No.: 883,213

[22] Filed: May 14, 1992

[30] Foreign Application Priority Data

May 17, 1991 [IT] Italy ............... MI 91 A0001354

[51] Int. Cl.$^5$ ............................................. C09K 15/00
[52] U.S. Cl. ........................................ 252/399; 252/189
[58] Field of Search .................................. 252/189, 399

[56] References Cited

U.S. PATENT DOCUMENTS

| | | | |
|---|---|---|---|
| 4,069,196 | 1/1978 | Ramey et al. | 524/102 |
| 4,526,931 | 7/1985 | Chiba et al. | 525/240 |
| 4,575,532 | 3/1986 | Schmukler et al. | 525/57 |
| 4,748,207 | 5/1988 | Kakugo et al. | 525/88 |
| 5,061,755 | 10/1991 | Suga et al. | 525/95 |

FOREIGN PATENT DOCUMENTS 0255743 2/1988 European Pat. Off. .
0278579 8/1988 European Pat. Off. .

*Primary Examiner*—Robert L. Stoll
*Assistant Examiner*—Valerie Fee
*Attorney, Agent, or Firm*—Oblon, Spivak, McClelland, Maier & Neustadt

[57] ABSTRACT

Process for obtaining granular forms of organic and inorganic antiacid additives and tetrakis-[3-(3,5-di-tert.-butyl-4-hydroxyphenyl)-propionyloxymethyl]-methane, carried out in the presence of an amount of the latter in the molten state, homogeneously distributed throughout the powder mass.

6 Claims, No Drawings

PROCESS FOR OBTAINING GRANULAR FORMS OF ADDITIVES FOR ORGANIC POLYMERS

The present invention relates to a process for granulating additive powders for organic polymers.

More in particular, the present invention relates to a process for granulating powders of organic and inorganic antiacid additives, together with an antioxidant stabilizer, i.e., tetrakis-[3-(3,5-di-tert.-butyl-4-hydroxyphenyl)-propionyloxymethyl]-methane.

The organic polymers, and, in particular, polyolefins, require that during their processing, additives suitable for neutralizing the acidic residues deriving from the polymerization catalysts, are added to them.

They furthermore require that stabilizer additives against the oxidative degradation caused by light or heat, are added to them.

One class of antioxidant additives is that of sterically hindered phenols, such as tetrakis-[3-(3,5-di-tert.-butyl-4-hydroxyphenyl)-propionyl-oxymethyl]-methane normally are in powder form.

Both the antiacid additives and tetrakis-[3-(3,5di-tert.-butyl-4-hydroxyphenyl)-propionyl-oxymethyl]-methane normally are in powder form.

When they are used during the processing of the polymers, these powders display the drawback that they show a tendency to disperse in air, thus being capable of causing damages to the health of the attending people, and of creating safety risks due to the possibility of explosions.

Another disadvantage inhering in the use of these additives in powder form, is their tendency to compact into agglomerates inside the feeding hoppers, resulting in an uneven metering of the additives to the polymers to be compounded.

On the other hand, the use of antiacid additives and tetrakis-[3-(3,5-di-tert.-butyl-4-hydroxyphenyl)-propionyloxymethyl]-methane in the stabilization of organic polymers poses difficulties as regards the obtainment of a complete homogenization of mixtures of both additives, and consequently of their mixtures with the organic polymer. This drawback results in unevennesses of stabilization.

In order to prevent the above drawbacks, attempts were carried out in the past, at granulating these additive powders, either as individual compounds or in mixture with each other, so as to obtain granulates which should be easy to be handled and metered.

For that purpose, granulation systems were resorted to in the past, which used dry-compacting machines, or dry pelletizers. Unfortunately, in most cases, these procedures showed to be poorly effective, because the resulting granules showed a low mechanical strength, and were difficult to be handled, owing to their tendency to crumble.

As an alternative, binding agents can be used, such as waxes, paraffins, stearic acid amides, and so forth. However, in that case undesired components are added to the polymer.

The present Applicant found now that the drawbacks which affect the processes known from the prior art can be avoided if one uses an improved process, by means of which granules with improved properties of mechanical strength are obtained, without that foreign compounds are added to the stabilizer formulation.

Furthermore, the process of the present invention makes it also possible, granules of the above said stabilizer compositions to be obtained, which display a high homogeneity level.

Therefore, the object of the present invention is a process for granulating powders of organic and inorganic antiacid additives for polymers and/or tetrakis-[3-(3,5-di-tert.-butyl-4-hydroxyphenyl)-propionyl-oxymethyl]-methane, with the use of pressure and/or heat, which process is characterized in that said granulation is carried out in the presence of at least 1% by weight of tetrakis-[3-(3,5-di-tert.-butyl-4-hydroxyphenyl)-propionyl-oxymethyl]-methane in the molten state, homogeneously distributed throughout the powder mass.

The amount of tetrakis-[3-(3,5-di-tert.-butyl-4-hydroxyphenyl)-propionyl-oxymethyl]-methane in the molten state is at least equal to 5% by weight, based to the weight of the powders to be granulated. More preferably, said amount corresponds to at least 10% of said weight.

Tetrakis-[3-(3,5-di-tert.-butyl-4-hydroxyphenyl)-propionyl-oxymethyl]-methane has the formula:

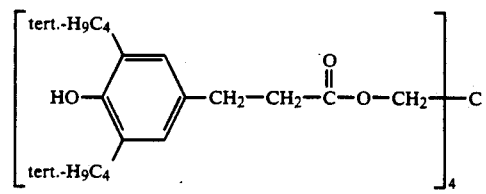

and is used in the art in the stabilization of organic polymers, as disclosed, e.g., in U.S. Pat. No. 3,644,428.

This compound can exist as a crystal solid in various allotropic forms showing melting temperatures comprised within the approximate range of from 110° C. to 125° C.

Besides the above said crystal forms, said compound can exist in an amorphous form, disclosed in U.S. Pat. No. 4,886,900, having a glass transition temperature (Tg) comprised within the range of from 40° C. to 54° C., and no showing endothermal melting peaks within the temperature range of from about 50° C. to 200° C. This amorphous form is obtained, according to said patent, by rapidly cooling a molten mass of the compound.

According to a form of practical embodiment of the process of the invention, tetrakis-[3-(3,5-di-tert.-butyl-4-hydroxyphenyl)-propionyl-oxymethyl]-methane is contained in the mixture of powders to be granulated, in its amorphous form, in an amount which is at least equal to the weight percentage thereof which is required in the molten state.

Thus, by operating at temperatures which are higher than the $T_g$ of amorphous tetrakis-[3-(3,5-di-tert.-butyl-4-hydroxyphenyl)-propionyl-oxymethyl]-methane, but lower than the melting temperatures of the compound in its crystal forms, said compound will be found in practically unchanged form in the granulated product.

In this case, the operation of granulation of the powders can be carried out by means of a roller compacting machine, with rollers heated at the required temperature.

More advantageously, one might use a single-screw or twin-screw extruder with zones heated at suitable temperatures, so as to produce a continuous strand ("noodle"), which can be subsequently cut. In that way, according to the diameter of the extrusion die, granules with different size can be obtained.

In the case in which, on the contrary, exclusively tetrakis-[3-(3,5-di-tert.-butyl-4-hydroxyphenyl)-propionyl-oxymethyl]-methane with crystal structure is used, the process should be carried out at temperatures of approximately 110° C.–125° C., and with such contact times, that at least that amount of said compound is in the molten state, which is required in the process according to the invention.

The amount, by weight, of tetrakis-[3-(3,5-di-tert.-butyl-4-hydroxyphenyl)-propionyl-oxy-methyl]-methane is preferably comprised within the range of from 10 to 90%, based on the total amount of powders to be granulated.

The customarily used antiacid additives are stearates, such as, e.g., calcium, zinc, magnesium or aluminum stearates; oxides, such as zinc or magnesium oxides, or titanium dioxide; man-made or natural carbonates, such as calcium carbonate or hydrotalcite.

The above compounds are known and available from the market. In particular as regards hydrotalcite, which is a compound having the formula $$Mg_6Al_2(OH)_{16}(CO_3) \cdot 4H_2O,$$

the product can be used, which is marketed by the Company KYOWA under the trade name DHT4A.

As amorphous tetrakis-[3-(3,5-di-tert.-butyl-4-hydroxyphenyl)-propionyl-oxymethyl]-methane, the product can be used, which is marketed by the Company Enichem Synthesis under the trade name Anox 20 AM.

As crystal tetrakis-[3-(3,5-di-tert.-butyl-4-hydroxyphenyl)-propionyl-oxymethyl]-methane, the commercial products Anox 20 ex Enichem Synthesis, or Irganox® 1010 ex Ciba-Geigy, can be used.

The granules obtained by means of the process according to the invention are endowed with satisfactory values of mechanical strength. The small amounts of powders which can be formed owing to mechanical stresses, are anyway free-flowing and dust-free. Therefore, the above said products can be homogeneously metered into the polymer.

Furthermore, by properly establishing the relative amounts of powders, granules can be prepared, which contain the antiacid additives and the antioxidant in the desired amounts, with a high level or homogenization.

Therefore, and extremely homogeneous distribution of the above said additives throughout the polymer to be stabilized is obtained, without the introduction of undesired compounds, and operating in the absence of dusts, is obtained.

In order to allow the possibilities of practical embodiment of the present invention to be better understood, the following examples are reported for merely illustrative, non-limitative purposes.

EXAMPLE 1

100 g of ANOX 20 and 100 g of calcium stearate are charged to a planetary powder mixer. The homogenized mixture is fed to a BRABENDER extruder equipped with a 475 mm long screw of 19 mm of diameter, with a compression ratio of 1:4, with four screw heating zones (which can be thermostatted at four different temperatures). The mixture is extruded through a circular die of 25 mm of diameter, with the screw revolving at the speed of 70 rpm, and with a constant temperature profile at 115° C.

A strand is obtained, which, after being cooled down to room temperature, is cut in order to obtain granules of approximately 2.5 mm of size.

The X-ray diffraction spectra of the granules shows that the latter are homogeneously constituted by calcium stearate, tetrakis-[3-(3,5-di-tert.-butyl-4-hydroxyphenyl)-propionyl-oxymethyl]-methane in both amorphous and crystal forms, with the crystal form prevailing over the amorphous form. The product results to be dust-free.

EXAMPLE 2

100 g of previously ground ANOX 20 AM and 100 g of calcium stearate are charged to a planetary powder mixer. The homogenized mixture is treated as in Example 1, with the only difference that the temperature profile is kept constant at 100° C.

A product is obtained, which is constituted by tetrakis-[3-(3,5-di-tert.-butyl-4-hydroxyphenyl)-propionyl-oxy-methyl]-methane with amorphous structure.

EXAMPLE 3

100 g of ANOX 20, 20 g of previously ground ANOX 20 AM and 100 g of calcium stearate are charged to a planetary powder mixer. The homogenized mixture is treated as in Example 2.

A product is obtained, which is analogous to the product obtained in Example 1.

EXAMPLE 4

160 g of ANOX 20 and 40 g of zinc stearate are charged to a planetary powder mixer. The homogenized mixture is treated as in Example 1, with the only difference that the temperature of the extruder is adjusted at 110° C.

A product is obtained, which is homogeneously constituted by zinc stearate, and both amorphous and crystal tetrakis-[3-(3,5-di-tert.-butyl-4-hydroxyphenyl)-propionyl-oxymethyl]-methane, with the crystal form prevailing over the amorphous form. The product results to be dust-free.

EXAMPLE 5

80 g of ANOX 20, 80 g of calcium stearate and 40 g of zinc stearate are charged to a planetary powder mixer. The homogenized mixture is treated as in Example 1, with the only difference that the temperature profile of the extruder, from the feed zone to the head zone, is of 110° C., 110° C., 110° C., 115° C.

A product is obtained, which is homogeneously constituted by calcium stearate, zinc stearate, and both amorphous and crystal tetrakis-[3-(3,5-di-tert.-butyl-4-hydroxyphenyl)-propionyl-oxymethyl]-methane, with the crystal form prevailing over the amorphous form. The product results to be dust-free.

EXAMPLE 6

100 g of ANOX 20, and 100 g of zinc oxide are charged to a planetary powder mixer. The homogenized mixture is treated as in Example 1.

A product is obtained, which is constituted by a homogeneous mixture of zinc oxide and both amorphous and crystal tetrakis-[3-(3,5-di-tert.-butyl-4-hydroxyphenyl)-propionyl-oxymethyl]-methane, with the crystal form prevailing over the amorphous form. The product results to be dust-free.

EXAMPLE 7

100 g of ANOX 20, and 100 g of hydrotalcite are charged to a planetary powder mixer. The homogenized mixture is treated as in Example 4.

A product is obtained, which is constituted by a homogeneous mixture of hydrotalcite and amorphous and crystal tetrakis-[3-(3,5-di-tert.-butyl-4-hydroxyphenyl)-propionyl-oxymethyl]-methane, with the crystal form prevailing over the amorphous form. The product results to be dust-free.

EXAMPLE 8

180 g of ANOX 20 and 20 g of previously ground ANOX 20 AM are charged to a planetary powder mixer. The homogenized mixture is treated as in Example 2.

A product is obtained, which is constituted by a homogeneous mixture of hydrotalcite and amorphous and crystal tetrakis-[3-(3,5-di-tert.-butyl-4-hydroxyphenyl)-propionyl-oxy-methyl]-methane, with the crystal form prevailing over the amorphous form. The product results to be dust-free.

EXAMPLE 9

160 g of ANOX 20 and 40 g of previously ground ANOX 20 AM are charged to a planetary powder mixer. The homogenized mixture is treated as in Example 2.

A product is obtained, which is analogous to the product of the preceding Example.

EXAMPLE 10

200 g of ANOX 20 is charged to a planetary powder mixer. The homogenized sample is treated as in Example 1, with the only difference that the temperature profile of the extruder, from the feed zone to the head zone, is of 110° C., 110° C., 110° C., 112° C.

A product is obtained, which is analogous to the product of Example 8.

EXAMPLE 11

In order to compare the mechanical properties of granules obtained according to the process of the present invention, to those of products obtained by powder compaction, tests of crumbling resistance were carried out.

A machine for powder sieving, and namely "Pulverisette" manufactured by the Company FRITSCH (Federal German Republic) was used. This machine is equipped with five sieves with decreasing mesh opening values, from top downward, of 2.80, 1.70, 1.00, 0.50 and 0.18 mm, and with a cover and a collecting bottom tray.

The machine performs the sieving operation by causing the sieve stack to vibrate. The vertical vibration stroke is of 1.6 mm.

In order to cause the granules to undergo percussions, the sieving was carried out by charging to the first four sieves, glass balls of 17,3 mm of diameter and with an average weight of 6.5 g. The number of balls charged to the sieves is the following: 11 balls to the first sieve (i.e., the 2.80 mm sieve), 10 balls to the second sieve (1.70 mm), 9 balls to the third sieve (1.00 mm) and 8 balls to the fourth sieve (0.50 mm).

The above said test was carried out on samples obtained from Examples 4, 5, 7 and 10, additionally to a sample obtained by means of the compaction of powders of ANOX 20 and zinc stearate in the ratio of 4:1 (Product "A") and on a sample obtained by means of the compaction of ANOX 20 powders (Product "B").

For each sample, 100 g of product are dry-sieved for 5 minutes, in the absence of glass balls, in order to determine the initial granulometric distribution. Then, the balls are charged to the sieves, and the determinations of granulometric distribution are repeated after a 10- and 20-minutes sieving, respectively. The results are reported in Table I.

From an examination of the results obtained, it results evident that the products prepared by means of the process according to the present invention are endowed with a higher mechanical crumbling resistance than as obtained by compacting the powders. In fact, with the mechanical stress conditions being the same, the products according to the invention give rise to a decidedly larger amount of fine fractions ("dusts").

EXAMPLE 12

By using a powder planetary mixer, a sample of commercial polypropylene of MOPLEN FLF20 type admixed with 0.2% by weight of a mixture of ANOX 20 and calcium stearate powders in the mutual ratio of 1:1, analogous to as used in Example 1, is prepared.

By operating according to the same procedure, a sample of the same polymer, admixed with 0.2% by weight of granules obtained from Example 1, previously ground, is prepared.

The resulting samples are submitted to replicate extrusion through the BRABENDER type laboratory extruder, with a screw revolution speed of 50 rpm and a temperature profile of 190° C., 235° C., 270° C., 270° C.

In Table II, the Yellow Index (YI) and the Melt Flow Index (MFI) of both polymer samples are reported, which were measured after the first, the third and the fifth extrusion passes. It can be observed that the granulation of the additives by means of the process according to the present invention is substantially immaterial as regards the performance thereof.

EXAMPLE 13

By operating in accordance with Example 12, a sample of commercial polypropylene of MOPLEN FLF20 type admixed with 0.1% by weight of ANOX 20 powders analogous to those used in Example 10, and a sample of the same polymer admixed with a same amount of granules from Example 10, previously ground, are extruded.

The YI and MFI values of both polymer samples, as measured after the first, the third and the fifth extrusion passes, are reported in Table III. As in Example 12, the granulation of the additives has no influence on their performance.

TABLE I

|           |            | <0.18 | 0.18–0.5 | 0.5–1.0 | 1.0–1.7 | 1.7–2.8 | >2.8 |
|-----------|------------|-------|----------|---------|---------|---------|------|
| Example 4 | 0 minutes  | —     | 1.2      | 6.0     | 49.1    | 39.9    | 3.8  |
|           | 10 minutes | 2.5   | 15.1     | 13.0    | 39.2    | 30.0    | 0.2  |
|           | 20 minutes | 3.8   | 31.7     | 14.2    | 30.1    | 20.2    | —    |
| Example 5 | 0 minutes  | —     | 1.4      | 13.6    | 32.0    | 51.9    | 1.1  |
|           | 10 minutes | 2.1   | 10.0     | 17.9    | 27.5    | 42.5    | —    |

TABLE I-continued

|  |  | <0.18 | 0.18-0.5 | 0.5-1.0 | 1.0-1.7 | 1.7-2.8 | >2.8 |
|---|---|---|---|---|---|---|---|
|  | 20 minutes | 4.6 | 25.6 | 29.7 | 15.0 | 25.1 | — |
| Example 7 | 0 minutes | 0.3 | 0.6 | 2.0 | 43.7 | 53.4 | — |
|  | 10 minutes | 2.7 | 18.0 | 23.3 | 41.9 | 14.1 | — |
|  | 20 minutes | 5.4 | 30.9 | 34.7 | 26.7 | 2.3 | — |
| Example 10 | 0 minutes | — | 1.0 | 1.2 | 31.5 | 65.4 | 0.9 |
|  | 10 minutes | 1.8 | 8.2 | 10.0 | 25.1 | 54.9 | — |
|  | 20 minutes | 4.3 | 21.2 | 35.7 | 17.3 | 21.5 | — |
| A | 0 minutes | 0.9 | 1.9 | 18.8 | 43.3 | 35.1 | — |
|  | 10 minutes | 21.4 | 69.2 | 9.4 | — | — | — |
|  | 20 minutes | 24.5 | 72.1 | 3.4 | — | — | — |
| B | 0 minutes | 2.7 | 11.7 | 20.2 | 50.0 | 15.4 | — |
|  | 10 minutes | 6.1 | 30.2 | 27.5 | 35.6 | 0.6 | — |
|  | 20 minutes | 11.0 | 42.2 | 31.5 | 14.8 | 0.5 | — |

TABLE II

|  | Powders | Granules |
|---|---|---|
| YI - 1$^{st}$ extrusion pass | −2.5 | −2.6 |
| YI - 3$^{rd}$ extrusion pass | −0.8 | −1.3 |
| YI - 5$^{th}$ extrusion pass | 0.7 | 0.3 |
| MFI - 1$^{st}$ extrusion pass | 20.7 | 20.6 |
| MFI - 3$^{rd}$ extrusion pass | 29.0 | 28.8 |
| MFI - 5$^{th}$ extrusion pass | 36.0 | 36.0 |

TABLE III

|  | Powders | Granules |
|---|---|---|
| YI - 1$^{st}$ extrusion pass | −1.8 | −1.6 |
| YI - 3$^{rd}$ extrusion pass | 2.2 | 2.9 |
| YI - 5$^{th}$ extrusion pass | 5.9 | 5.7 |
| MFI - 1$^{st}$ extrusion pass | 15.7 | 15.5 |
| MFI - 3$^{rd}$ extrusion pass | 19.0 | 18.4 |
| MFI - 5$^{th}$ extrusion pass | 23.0 | 22.2 |

We claim:

1. A process for preparing a granulate of an antioxidant and organic-inorganic antiacid additives for polymers and/or tetrakis-(3-(3,5-di-tert-butyl-4-hydroxyphenyl)propionyloxymethyl)methane, comprising:
    granulating under heat and/or pressure a powder of organic and inorganic antiacids and tetrakis-(3-(3,5-di-tert-butyl-4-hydroxyphenyl)propionyloxymethyl)methane, in which at least one percent of tetrakis-(3-(3,5-di-tert-butyl-4-hydroxyphenyl)propionyloxymethyl)methane is in the molten state, thereby homogeneously distributing the tetrakis-(3-(3,5-di-tert-butyl-4-hydroxyphenyl)propionyloxymethyl)methane throughout the powder mass.

2. The process according to claim 1, wherein said tetrakis-(3-(3,5-di-tert-butyl-4-hydroxyphenyl)propionyloxymethyl)methane, in the amorphous state, is present in the stated amount in the material being granulated, and wherein melting occurs at a temperature higher than the glass transition temperature (Tg) of the amorphous tetrakis-(3-(3,5-di-tert-butyl-4-hydroxyphenyl)propionyloxymethyl)methane, but lower than the melting temperature of the same compound in crystal form.

3. The process of claim 1, wherein the tetrakis-(3-(3,5-di-tert-butyl-4-hydroxyphenyl)propionyloxymethyl)methane is present in one or more of its crystal forms, and wherein said process is carried out at a temperature of about 110°-125° C.

4. The process of claim 1, wherein said granulate is obtained by means of an extruder.

5. The process of claim 1, wherein the antiacid compound is a member selected from the group consisting of stearates, oxides and carbonates.

6. A method of stabilizing an organic polymer, comprising: blending the granulate prepared by the process of claim 1 in a polymer.

* * * * *